United States Patent [19]

White

[11] Patent Number: 4,892,631

[45] Date of Patent: Jan. 9, 1990

[54] RECOVERY OF PRECIOUS METALS FROM COMPLEX ORES

[76] Inventor: Merwin G. White, P.O. Box 404, Moapa, Nev. 89025

[21] Appl. No.: 208,758

[22] Filed: Jun. 20, 1988

[51] Int. Cl.$^4$ .............................. C25C 1/20; C22B 4/00
[52] U.S. Cl. ................................... 204/109; 75/10.62; 75/83
[58] Field of Search ....................... 204/112, 114, 109; 75/10.62, 83

[56] References Cited

U.S. PATENT DOCUMENTS

| | | | |
|---|---|---|---|
| 2,131,072 | 9/1938 | Reid | 75/83 |
| 2,261,946 | 11/1941 | Avery | 75/10.62 |
| 4,229,270 | 10/1980 | Subramanian et al. | 204/109 |
| 4,462,879 | 7/1984 | Castellanos et al. | 75/83 X |

FOREIGN PATENT DOCUMENTS

2049734  12/1980  United Kingdom ..................... 75/83

*Primary Examiner*—Donald R. Valentine
*Attorney, Agent, or Firm*—B. Deon Criddle

[57] ABSTRACT

Precious metals are resolved and recovered from complex ores by a repetitious process of (1) heating in an electric arc furnace, a source containing complex ore values with fluxes and a base metal, to which a precious metal inquart has preferably been added, thereby smelting the precious metal values into the base metal; (2) transferring the base metal in an acid-proof bag to an electrolytic cell where the base metal becomes the anode and subjecting the cell to a direct positive current causing the base metal and unresolved "complex" values to be dissolved from the anode and plate out on a cathode leaving the precious metal inquart and resolved precious metals in the acid-proof bag in the form of an anode mud; (3) charging the cathode and any undissolved anode back to the smelting operation and repeating the smelting and electrolysis operations as many times as necessary to resolve the complex values in the source and collecting them in the anode mud. Anode mud from a series of cycles is collected, combined and subsequently smelted and electrolyzed, thereby recovering a rich anode mud which is commercially salable, or from which gold, silver and metals from the platinum group may be separated.

4 Claims, No Drawings

RECOVERY OF PRECIOUS METALS FROM COMPLEX ORES

BRIEF DESCRIPTION OF THE INVENTION

1. Field of the Invention

This invention relates to the recovery of precious metals from complex ores.

2. Background of the Invention

This invention relates to a method for resolving precious metals from a non-recoverable complex form into a simple recoverable form. More specifically, this invention relates to a method for resolving precious metals from a complex form to a recoverable form by means of a repetitive cycle of smelting and electolytic processing of the smelt.

It has been known for many years that there are a great many ore deposits, gangue, piles, tailing residues and slag dumps and other mineral sources that contain precious metal values which are either unassayable or which do not yield consistant assayable results by conventional assay methods. These precious metal sources have not been possible to treat since they have not proven amenable to assay by fire assay, wet analysis, x-ray diffractions or atomic absorption techniques. It has not been possible to treat these sources by conventional processing methods such as roasting with acids, cyanide leaches, straight chlorine extractions, aqua regia leaches or direct amalgamation, and to consistently obtain release of precious metal values from such sources.

Because of the non-availability of these mineral sources to identification and recovery by conventional techniques and processes, these sources, primarily ores, have been referred to by various names such as unconventional ores, unprocessable ores, non-assayable ores and complex ores. However these ores are preferably referred to as complex ores or ores containing precious minerals in complex form. When so used, this terminology should be and is hereby distinguished from use of the term "complex ore" to refer to ores containing many base and precious metals which are difficult to separate but are assayable by standard methods.

PRIOR ART

Many researchers have attempted to unlock the key to processing these complex ores which contain precious metal values that will not yield consistent assayable results by standard methods. A method is claimed in U.S. Pat. No. 3,150,960 for processing such ores by a multi-step process involving digestion, filtration, precipitation, oxidation and reduction. A different method for processing such ores is found in U.S. Pat. No. 3,058,985 which involves a specific roasting process followed by leaching. A still different method of processing such ores is found in U.S. Pat. No. 3,988,415 which claims heating said ores in a dry state with chloride and nitrate salts in the absence of oxygen followed by sublimation or vaporization of the precious metal salts formed.

While these methods may yield positive results on certain types of ores or other metal sources containing complex precious metal values the results appear to be not always consistent or necessarily reproducible.

OBJECTS OF THE INVENTION

It is an object of the present invention to provide a process for the resolution of complex precious metal compositions into simple values recoverable by conventional methods.

It is also an object of the present invention to provide a process for the resolution of complex precious metal values into recoverable values by means of electro-conversion.

A further object of the present invention is to provide a process for repetitively treating a source containing complex precious metal values wherein, with each treatment, a portion of the complex values is resolved into simple values and the unresolved complex values are recovered for recycling.

FEATURES OF THE INVENTION

These and other objects may be accomplished by means of a process wherein ores or other metal sources are first heated in an electric arc furnace in the presence of fluxes, a base metal, and a precious metal inquart to a white hot heat, i.e., 2,100° F. to 2,300° F. wherein at least some of the complex precious metal values are normalized. Substantially all of the precious metals are collected into the inquart base metal matrix and the slag is removed and discarded. The inquart-base metal matrix is poured or cast into a flat metal sheet for use as an electrode. The flat metal sheet is used as an anode in an electrolytic cell utilizing an acid electrolyte that will dissolve the base metal and plate it onto a cathode which is generally a stainless steel sheet. The anode is placed in a porous acid-proof bag which collects the undissolved anode mud containing the inquart and normalized precious metal values. After the base metal, which is usually copper or lead, has plated out on the cathodes, four basic products are contained within the electrolytic cell; (1) an anode stub, (2) an anode mud containing within the bag, (3) the cathode, and (4) the acidic electrolytic solution.

The complex precious metal values normalized in the furnace and the precious metal inquart are contained in the anode mud which may also contain a minor amount of unresolved complex values. However, the major portion of complex values not normalized in the furnace are contained in the acid electrolyte bath and cathode. The bulk of undecomposed complex values are plated out on the cathode. The anode mud is collected and saved and the cathode and anode stub are charged back to the electric ore furnace and are resmelted.

The cycle of recharging the cathode and anode stub back into the furnace followed by electrolysis is continued or repeated as many times as necessary. After each recycle the anode mud on an additive basis, after deducting added inquart values, will increase. When the assayable value of the anode mud from a particular cycle shows no significant resolution of complex values into normal values the cathode is not recycled as such, but is charged back to the furnace as the base metal for a new charge of ore or other materials containing unresolved complex metal values.

When sufficient anode mud has been collected it is separately charged to a furnace and smelted into a very rich bar which is subjected to electrolysis in a separate cell. The anode mud from this operation is very high in precious metal content and is a salable product as such, or which may be further processed by conventional precious metal refining techniques.

Additional objects and features of the invention will become apparent to persons skilled in the art to which the invention pertains from the following detailed description and claims.

DETAILED DESCRIPTION OF THE CLAIMS

The term "precious metals" refers to gold, silver and the platinum group which includes platinum, palladium, rhodium, ruthenium, iridum, and osmium. These metals may occur in their elemental state, but may also exist in various other forms. For example, they may be allowed with iron, copper, nickel, and other precious metals as well as being combined, complexed, or otherwise chemically or physically bound in other ways.

While not wishing to be bound by any particular theory, it is believed that many complex precious metal values exist wherein gold and silver are tied into a very stable intermetallic complex with platinum group metals and rhenium. In particular, it is believed that osmium and rhenium cause the greatest interference in processing complex ores. For example, if a good grade gold ore is fired assayed and then doped with osmium and rhenium and reassayed, the fire assay results of the doped ore will show about 85 percent less gold than in the original sample.

It is therefore believed that treatment of sources containing complex precious metal values by a process that will oxidize osmium and rhenium to osmium tetraoxide and rhenium heptaoxide and supply sufficient heat to volatilize these compounds from the system will result in the decomposition of complex precious metal values to simple precious metal values which can then be recovered by conventional processing.

This process of this invention can be used to normalize complex precious metals from a variety of sources. The metal source is first prepared by crushing, grinding or otherwise pulverizing the materials to a size finer than 20 mesh and preferably finer than 65 mesh. Placer or gravity concentrates need to be ground to at least minus 65 mesh because of the refactory nature of some of the heavy minerals that are concentrated therein such as zircon, magnitite, chrome, topaz, and ilemenite.

The material to be treated should also be dried prior to smelting.

(1) Smelting Process

The smelting process is begun by charging a finely divided source containing complex precious metal values into an electric arc furnace along with appropriate amounts of fluxes, inquart, and a base metal. Heating is accomplished by arcing between electrodes and by the resistance of the electrical current flowing between electrodes in a molten salts bath created by the melting of the charge placed in the furnace. Each charge must be fluxed for maximum smelting capacity of the base material being smelted and for maximum resistance in the furnace. Moreover, the molten charge must be quite fluid to allow good separation of the slag and metal phases within the furnace and to facilitate ease of separating the slag from the metal phase when poured. However, a balance needs to be maintained between a very fluid slag and a syrupy one. If the slag is too fluid the base metal and inquart will settle too fast for good absorption of the precious metals. If the slag is too viscous the metallics cannot settle at all.

Therefore it follows that each ore or other mineral source to be smelted must be tested with several small scale fusions using different amounts and various chemical balances within the flux to achieve optimum results. This can best be done empirically by one having ordinary skill in the art using the guide lines set forth herein.

Fluxes may be defined as compounds or compositions that function as solvents for crushed ore, sand, or other mineral sources to produce a molten slag phase. The molten slag phase consists of fused igneous solutions of basic and acidic oxides and other compounds formed by the reaction of such oxides with each other or other materials. However, substances that are not oxides usually are not soluble in the slag phase. Thus, metals reduced during the smelting process are heavier than the slag and sink to the bottom of the furnace or crucible. The common fluxes used to form slags are soda ash (anhydrous sodium carbonate), caustic lime (calcium oxide), fluorspar (calcium fluoride), and silica (silicon dioxide).

The primary requirement of the slag is that it will remove or take up many of the non-volatile impurities in the smelt and hold them in a liquid condition while allowing the heavier metal phase to separate completely at the temperature of the melt. Of course, the slag should be as inert as possible toward the refactory lining of the crucible or furnace. In general most smelter slags are predominately calcium and iron silicates. The fluxes should also be as inexpensive as possible in order to maximize profits from the precious metal recovery. Fluxing costs are the most expensive single item in carrying out this invention. In the present invention, the slag should be essentially neutral and may consist primarily of sodium, calcium, iron, and aluminum silicates with some borates.

As previously stated, each flux mixture, while very important to the overall precious metal resolution from complex to simple values, must be empirically determined. A typical flux for charging with 100 pounds of a placer concentrate is as follows:

Soda Ash 100 lbs.
Silica Sand 55 lbs.
Anhydrous Borax 25 lbs.
Calcium Oxide 10 lbs.
Charcoal or Coke 5 lbs.

Such a flux is thoroughly mixed; i.e., in a cement mixer and is charged into the furnace in increments as the smelt progresses.

A base metal is added with the flux to serve as a matrix for collecting precious metal values. Lead or copper are the preferable base metals with copper being especially preferred since it readily plates out onto the cathode and is easily recycled. The amount of base metal charged with the flux will depend, to some extent, upon the metal values in the concentrate, or other metal source being smelted. Generally, the weight ratio of metal source to base metal will vary from about 1:4 to 4:1 with a 1:1 ratio being near optimum for most operations. By adding the base metal along with the flux in increments the precious metals are milked from their source out of the slag and into the base metal and into the bottom of the vessel.

Often a dramatic increase in yield of precious metals may be observed by the addition of an inquart along with a base metal. An inquart is a known amount of silver and/or gold which is added to the charge in the furnace to attract precious metal values out of their source and into the base metal. A careful accounting must be kept of the inquart material in ordr to accurately determine yields of precious metals from sources being processed. The inquart may be in the form of elemental metals, alloys, sludges, high grade residue and ores, film ash, and the like. Even the initial fusion will show much higher gains in gold and silver values when using the inquart than without. Also the platinum group metals, which may not be resolved from their complex form until after several recycles, tend to show up much earlier in the processing sequence when using an inquart. The amount of inquart added may vary greatly, but wil generally exceed the amount of precious metal thought to be in the metal sources being processed. For example, a placer concentrate assaying (by fire assay) 8 oz./ton of gold and 20 oz./ton of silver may typically be treated with an inquart containing sufficient silver to make the concentrate equivalent to 200 oz./ton of silver. Only practical experience can dictate the proper amount and the type of inquart.

The smelting operation is initiated by placing a charge in a crucible. Carbon electrodes, which may be two inches or more in diameter, are positioned near the bottom of the crucible and are covered with the ore (metal source) flux charge. The power source is turned on placing a voltage potential between the electrodes. A used piece of carbon electrode, or other current carrying material, is placed between the two electrodes and an arc is pulled back and allowed to burn for several minutes causing a pool of molten ore and flux to form. The molten pool will conduct an electrical current, but has sufficient resistance to cause more melting to occur. When a full pool of molten slag is formed the electrode piece is removed and the melt is continued.

The ore or other source is added slowly in increments as the melt continues with the current being adjusted as necessary to keep the temperature of the melt between about 2,100° F. and 2,200° F. The proper voltage and current will depend upon the size of the crucible and electrodes, and also upon the conductivity of the melt. For example, on a small furnace containing an ore charge of up to 50 pounds, the power supply should operate between 400 and 700 amps with the voltage being maintained between about 40 to 45 volts. If the resistance of the smelt drops the conductivity will be too high for proper functioning of the heated mixture and the composition of the smelt may have to be adjusted. The conductivity is balanced by the addition of soda ash and silicate mixtures to the smelt.

After all the increments of ore, flux, base metal, and inquart have been added, the temperature is raised to about 2,300° F. and additional base metal mixed with flux is added to milk any remaining precious metal values out of the slug.

Generally speaking, when the slag contains less than about 0.25 ounces of fire assayable silver per ton the smelting is considered to be complete. By complete is meant that most, if not all, of the complex metal values have been removed from the slag and driven into the base metal and inquart. Also, at the processing temperatures it can be assumed that certain osmium and rhenium values have been oxidized and vaporized from the smelt and that at least a portion of the complex precious metal values have been resolved or decomposed into conventional recoverable forms.

If the molten contents in the furnace are heated longer than necessary, it is possible that iron contained within the charge will reduce as an iron silicide and go into the metal phase. When the metal phase is cast into electrodes the iron silicide forms buttons or globules on the surface therof. It is better metallurgically in the subsequent electrolytic phase to avoid this reaction. Experience gained with a few smelts will allow an operator to determine when a smelt is ready for slag removal and thus avoid any problems resulting from "overcooking".

When the fusion within the furnace is complete the crucible is tilted and the slag layer is drawn off. The last bits of slag may be removed by spreading a thin layer of portland cement on the molten metal surface and skimming it off.

The slag is weighed, assayed, and will usually be discarded. However, if a poor fusion has been obtained and high values of precious metals are found to be in the slag, it may be resmelted.

In actual practice it may be preferable to charge the furnace several times and also remove the slag several times letting the metal phase accumulate in the bottom of the furnace instead of removing it each time slag is withdrawn.

After the slag has been withdrawn the crucible is tilted to allow the molten metal to be poured into dry molds of a size that the solidified metal can be used as an anode in an electrolytic cell. A sample of each anode is taken at the time of casting and assayed.

(2) Electrolytic Refining

Anodes from the smelting operating previously defined are hung in electrolytic cells alternately with cathodes. The cathodes are usually relatively thin sheets of stainless steel with a copper bus bar bolted on the top. For optimum results the spacing between the various electrodes in the cell should be at least three inches, but not more than five inches. The number of electrodes will depend upon the size of the cell and the capacity of the power supply.

The cells are filled with an acid electrolyte. A solution of ten percent nitric acid is preferable with lead anodes. Sulfuric is the preferable acid with copper anodes. Hydrochloric and fluorsilisic acids may be used under certain conditions.

A direct current power supply is used having th capacity of delivering a current density of at least 50 amps/ft of cathode surface area. The voltage will vary according to the amount of resistance encountered within the electrolyte. In other words, the voltage potential will be great enough to force the desired amperage through the electrolyte to the cathode surfaces.

The anodes are attached to the positive pole of the direct current power supply so as to attract the nitrate or other acid anions. The base metal (preferably copper) of the anode is dissolved into the electrolyte and migrates as a positive ion to the cathode where it is deposited or plated out as a sponge metal or as an oxide; i.e., cuprous oxide. In order to obtain a good spongy deposit that will break into fine particles forecharging back to the furnace in the smelting operation, it is preferred to operate the cells such that the initial current density at the cathode surface will be about 50 amps/ft. The minium amperage at the cathode, in order to obtain a good hard coherent copper deposit, will be about 15 amps/ft. Thus, when copper or other base metals are to be recycled to the furnace, it is desirable to use a higher amperage to obtain a spongy deposit at the cathode and when a hard, marketable deposit is desired the copper will be plated out at the lower end of the amperage range.

In order for the cathode to obtain optimum base metal deposits, the cell preferably will contain conditioning agents. Agents conventionally used include animal glue and goulac as well as black strap molasses.

In the cell the anodes are contained within porous acid resistant bags. Bags such as woven polyesters allow acid and ions to penetrate the bag, but retain the anode mud or slime containing precious metal values within the bag. All of the fire assayable gold remains in the bag as does most of the normal silver. However, the complex precious metal values present a different situation. It appears that a samll amount of complex values remain in the anode mude with the majority beig dissolved from the anode and passing through the pores in the bag into the electrolyte. It is believed that most of the complex values, which do go into solution, are deposited at the cathode with the sponge copper or other base metal. The complex values then remaining in the acid electrolyte are recovered during cleanup of spent or fouled electrolyte. The electrolyte becomes fouled by impurities such as iron nitrate which starts to precipitate as a brown sludge. When this sludge appears the electrolyte is drawn off and a new acid solution is placed within the cell. The fouled electrolyte is treated with scrap iron, which can be of any size, but preferably is old detinned cans, to precipitate the sludge which is filtered, dried, assayed, weighed, and then charged back to the furnace. Thus, all of the complex values are retained for retreatment in a smelting operation where additional decomposition into normal values may occur.

As each anode becomes dissolved by electrolysis there usually remains a stub. Each stub is washed and dried, and the precious metal content thereof is calculated before it is charged back into the furnace. The stubs do not have to be assayed as they have the same composition as when cast from the furnace into the molds.

The anode muds, or slimes as they are sometimes called, are washed out of the bags into a filter where they are washed and dried. An assay is made of each batch collected. A number of batches are accumulated until sufficient dried muds are obtained to form a charge to the furnace. When a charge of anode muds is smelted in the manner described and the metal phase is collected the resulting anode is very rich in precious metal values. When such anodes are subjected to electrolysis in a separate cell a second anode mud is obtained which usually contains a precious metal content that may vary from 25 to 40 percent by weight. This mud may be sold directly to a precious metals refinery or may be subjected to further treatment utilizing conventional technology for the refining and separation of precious metals. For example, the anode mud could be smelted to Dore' metal in a small rocking-type furnace and the precious metals subsequently recovered by conventional techniques.

The present invention provides a method for consistently recovering precious metals from complex ores. The process involved utilizes known, available apparatus and is readily practiced and is reproducible, as necessary.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A method of recovery of precious metals from complex ores comprising
   (a) heating a complex ore having a precious metal inquart added thereto before heating and a base metal in an electric arc furnace to smelt precious metal values contained in the ore into the base metal;
   (b) transferring the base metal having precious metal values smelted therein in an acid-proof bag to an electrolytic cell;
   (c) positioning the base metal to be an anode of the cell;
   (d) subjecting the cell to a direct positive current whereby the base metal and unresolved complex values are plated out on a cathode of the cell and the resolved precious metal remain in the bag in the form of an anode mud; and
   (e) smelting and electrolyzing the anode mud to recover a rich anode mud.

2. A method as in claim 1, further including charging the cathode and any undissolved anode back to the electric arc furnace to be further smelted prior to smelting and electrolyzing the anode mud to recover a rich anode mud.

3. A method of recovery of precious metals from complex ores comprising
   (a) heating a complex ore in an electric arc furnace in the prescence of fluxes, a base metal and a precious metal to a white hot heat to form an inquart base metal matrix to thereby smelt precious metal values contained in the ore into the base metal;
   (b) transferring the base metal having precious metal values smelted therein in an acid-proof bag to an electrolytic cell;
   (c) positioning the base metal to be an anode of the cell;
   (d) subjecting the cell to a direct positive current whereby the base metal and unresolved complex values are plated out on a cathode of the cell and the resolved precious metals remain in the bag in the form of an anode mud; and
   (e) smelting and electrolyzing the anode mud to recover a rich anode mud.

4. A method as in claim 2, wherein substantially all of the precious metals are collected into the inquart base metal matrix and the slag is removed and discarded; and the inquart base metal matrix is formed into a flat metal sheet for use as the anode.

* * * * *